United States Patent [19]

Sawada et al.

[11] Patent Number: 5,257,204

[45] Date of Patent: Oct. 26, 1993

[54] AUTOMATIC MEASURING APPARATUS FOR MEASURING A THREE-DIMENSIONAL CONTOUR

[75] Inventors: Mihoko Sawada, Chigasaki; Hiromichi Kinoshiro, Yokohama, both of Japan

[73] Assignee: Matsushita Electric Industrial Co., Ltd., Osaka, Japan

[21] Appl. No.: 672,919

[22] Filed: Mar. 21, 1991

[30] Foreign Application Priority Data

Apr. 5, 1990 [JP] Japan .................................. 2-91603

[51] Int. Cl.⁵ ........................ G05B 19/42; G06F 15/46
[52] U.S. Cl. ........................... 364/474.24; 364/474.37; 364/191
[58] Field of Search ............. 364/474.24, 474.32, 364/474.37, 191, 578, 550, 551.02

[56] References Cited

U.S. PATENT DOCUMENTS

| | | | |
|---|---|---|---|
| 4,631,870 | 12/1986 | Sun | 364/474.23 |
| 4,636,960 | 1/1987 | McMurty | 364/474.37 |
| 4,665,493 | 5/1987 | Hattori | 364/474.37 |
| 4,697,240 | 9/1987 | Cedar et al. | 364/474.24 |
| 4,796,195 | 1/1989 | Haggerty | 364/474.37 |
| 4,901,253 | 2/1990 | Iwano et al. | 364/550 |
| 4,918,611 | 4/1990 | Shyu et al. | 364/474.24 |
| 4,928,221 | 5/1990 | Belkhiter | 364/474.24 |
| 4,967,365 | 10/1990 | Hampl et al. | 364/474.24 |
| 4,977,512 | 12/1990 | Nakagawa | 364/474.37 |
| 5,095,788 | 3/1992 | Mayoni | 364/474.37 |

Primary Examiner—Jerry Smith
Assistant Examiner—Paul Gordon
Attorney, Agent, or Firm—Stevens, Davis, Miller & Mosher

[57] ABSTRACT

Disclosed is an automatic program forming apparatus which automatically forms a part program for extracting the contour measurement position of a measurement object and the measurement condition data from two-dimensional CAD graphic information, and for calculating the XYZ coordinates of the approach position, entering position, etc. of a probe of a three-dimensional contour measurement device at the time of the contour measurement on the basis of the extracted contour measurement position and measurement condition data to thereby control the three-dimensional contour measurement device; and which automatically forms a test program for simulating the measurement operation of the part program in advance.

4 Claims, 3 Drawing Sheets

A ··· APPROACH POSITION
B ··· ENTERING POSITION
C ··· ENTERING DIRECTION
       INDICATING POSITION
D ··· START POINT
E ··· END POINT

AUTOMATIC MEASURING APPARATUS FOR MEASURING A THREE-DIMENSIONAL CONTOUR

BACKGROUND OF THE INVENTION

1. FIELD OF THE INVENTION

The present invention relates to an automatic program forming apparatus for the automatic measurement of a contour, by which a three-dimensional measurement used for the evaluation and identification of a product is conducted.

2. DESCRIPTION OF THE RELATED ART

A computer numerical control (CNC) three-dimensional measurement device has been used for contour measurement, that is, for measuring a sectional contour as a train of dots to thereby observe the finished state of the curved surface form of a measurement object. In the conventional measurement, dot train data are taken in under an individually designated measurement condition by moving a probe of the CNC three-dimensional measurement device along the contour by manual inputting.

However, the measuring operation in the conventional manual measurement is not efficient, because an operator must always monitor the three-dimensional measurement device. Further, a large time is required for the measurement. There arises a problem in that accurate measurement based on a large amount of measurement data cannot be made.

SUMMARY OF THE INVENTION

It is therefore an object of the present invention to provide an automatic program forming apparatus for automatically forming a measurement procedure for a three-dimensional measurement device to attain long-time unmanned accurate measurement to thereby solve the problem in the prior art.

In order to attain the foregoing object, according to an aspect of the present invention, the automatic program forming apparatus comprises: means for forming a part program for finding movement locus data by calculating the entering direction, entering position and approach position of a probe of a computer numerical control (CNC) three-dimensional measurement device on the basis of the contour measurement position of a measurement object and measurement condition data designated by two-dimensional computer-aided design (CAD) information given by a CAD device to thereby perform automatic contour measurement through the CNC three-dimensional measurement device; and means for forming a test program for simulating the movement locus of the part program through the CNC three-dimensional measurement device on the basis of the movement locus data.

In the aforementioned configuration of the present invention, both a part program for performing automatic contour measurement in a CNC three-dimensional measurement device on the basis of the contour measurement position of a measurement object and measurement condition data designated by two-dimensional CAD information pertaining to the measurement object and a test program for simulating the movement locus of the part program through the CNC three-dimensional measurement device to confirm the safety of the data can be formed automatically in a short time.

DESCRIPTION OF THE PREFERRED EMBODIMENTS

An embodiment of the present invention will be described below with reference to the drawings.

Figure 1:
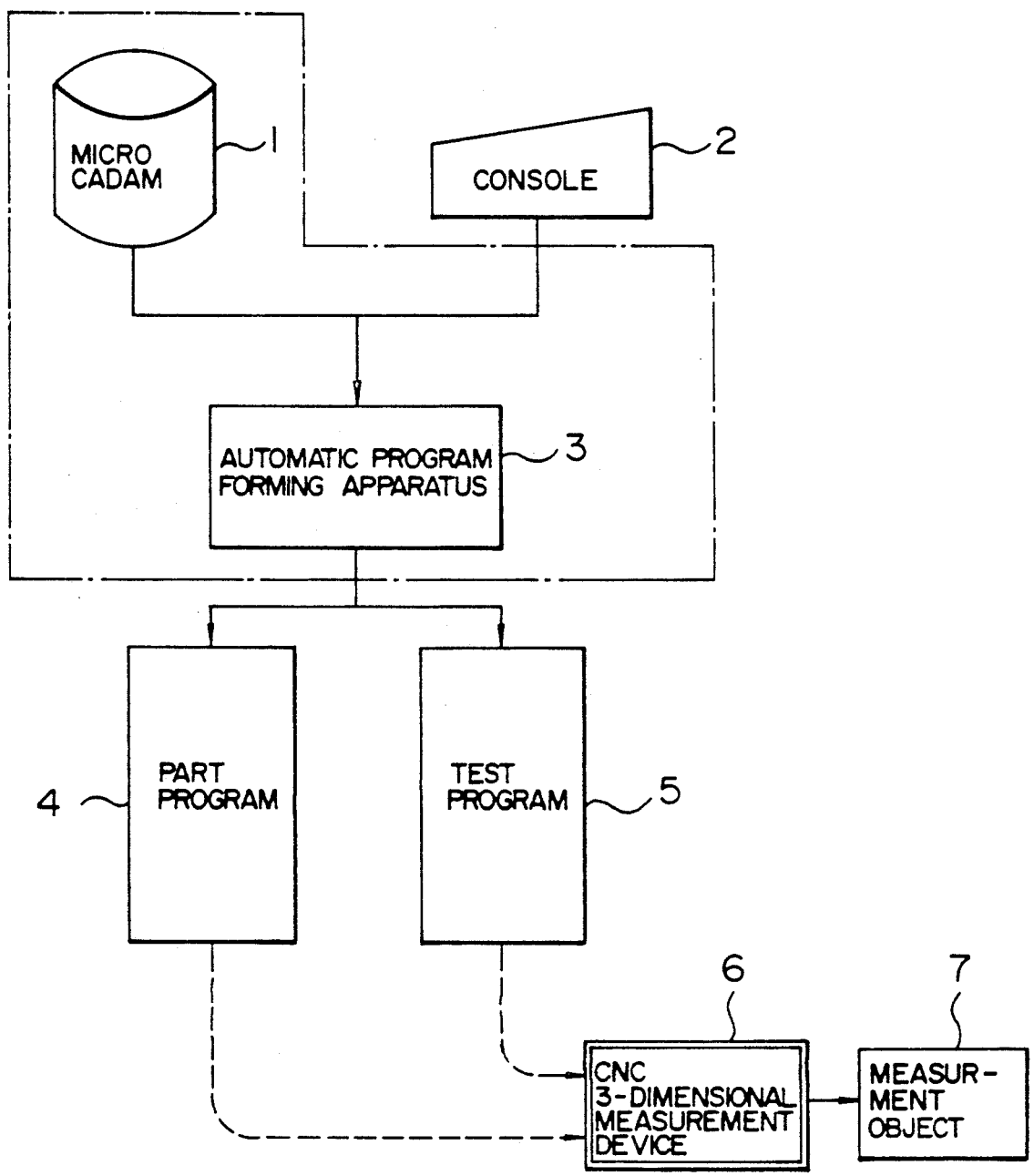
FIG. 1 is a block diagram of a three-dimensional measurement system using an automatic program forming apparatus according to the present invention.

FIG. 1 is a block diagram of a three-dimensional measurement system using an automatic program forming apparatus according to the present invention.

Graphics represented by three orthogonal views are registered in a two-dimensional CAD device MICRO.-CADAM 1. The contour measurement position and measurement condition data of an object to be measured (measurement object) 7 are described in the graphics. The contour measurement position and measurement condition data of the measurement object 7 are conversationally inputted, through a console 2, into an automatic program forming apparatus 3 constituted by a computer including a stand-alone type MICRO.-CADAM 1. The automatic program forming apparatus 3 finds movement locus data by calculating the XYZ coordinates of the entering direction, entering position and approach position of a probe on the basis of the aforementioned data and other data inputted through the console 2, to thereby form a part program 4 for performing automatic contour measurement through a CNC three-dimensional measurement device 6 and, further, form a test program 5 for simulating the movement locus of the part program 4 through the CNC three-dimensional measurement device 6 on the basis of the movement locus data. The three-dimensional measurement device 6 performs the automatic contour measurement and simulation of the measurement object 7 according to the two programs 4 and 5.

An example of the contour measurement position and measurement condition data of the measurement object 7 registered in the MICRO.CADAM 1 will be described below.

Figure 2:
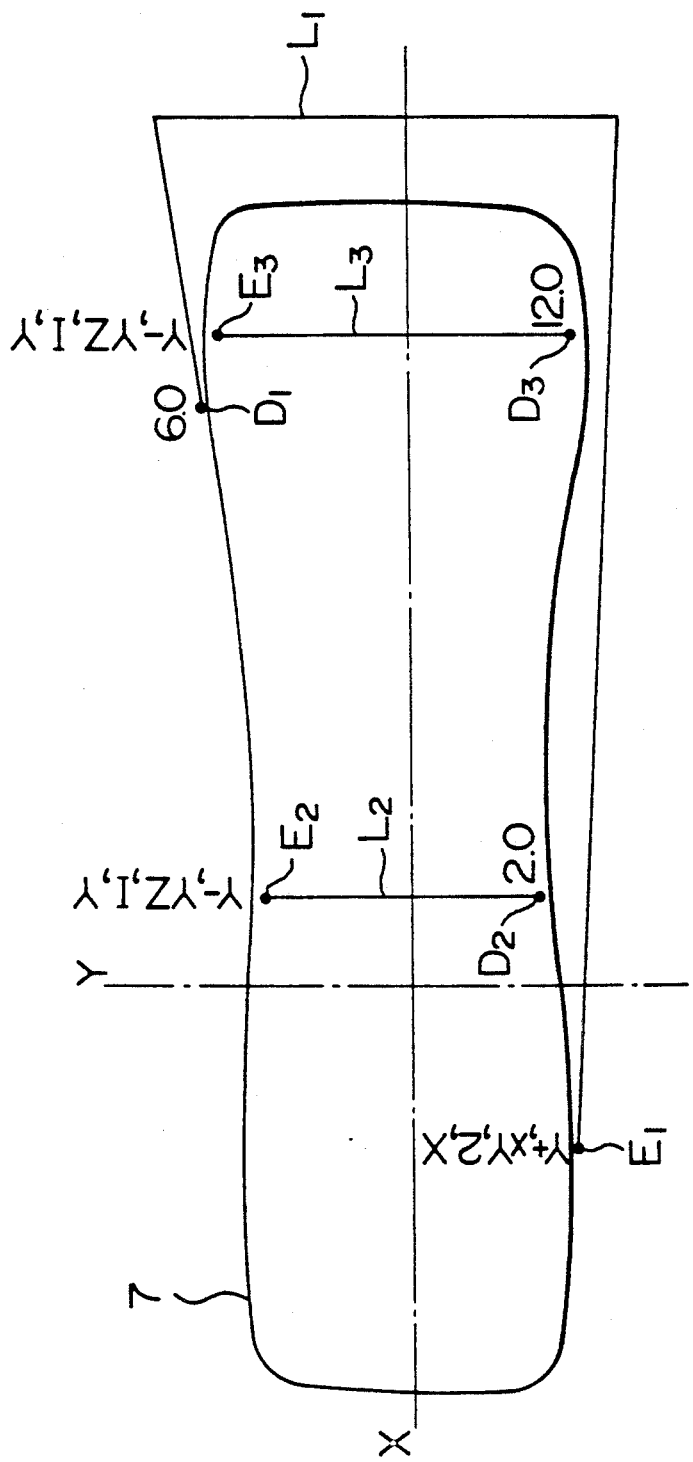
FIG. 2 is a view showing measurement positions and conditions designated in two-dimensional CAD graphics of a measurement object.

FIG. 2 shows measurement conditions and measurement positions in an X-Y coordinate plan view registered in the MICRO.CADAM 1. There are shown measurement positions having measurement points as connected between respective start points $D_1$, $D_2$ and $D_3$ and end points $E_1$, $E_2$ and $E_3$ by lines $L_1$, $L_2$ and $L_3$.

The value of the end point is described at the start point D. The entering direction, the measurement plane and the end condition are described at the end point E. For example, (Y+, XY, 2, X) described at the end point $E_1$ represents the following conditions; the entering direction of the probe is positive (Y+) with respect to the Y ordinate; the measurement plane is an XY plane (XY); and the measurement is finished when X=6.0 (the value of the start point $D_1$) occurs twice (2, X). A processing is made on the basis of data registered in the aforementioned state.

In the following, an example of the calculation of the XYZ coordinates of the entering direction, entering position and approach position of the probe is described.

Figure 3:
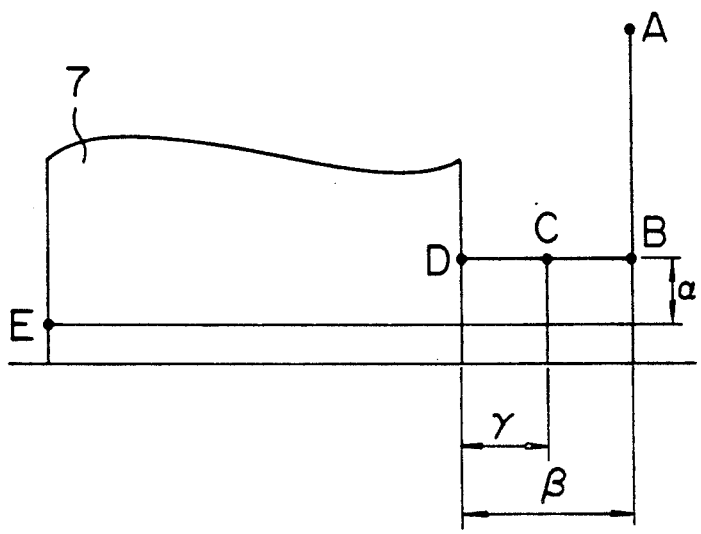
FIG. 3 is a view in section, showing the entering and measurement operation positions of a probe in a measurement line.

FIG. 3 is a view in section, showing the entering position and measurement operation position of the probe on one measurement line.

Although the XYZ coordinates of the end point E and the XY coordinates of the start point D are extracted from the data registered in the MICRO.-CADAM 1 in FIG. 2, the Z-direction difference $\alpha$ between the end point E and the start point D, the distance $\beta$ between the start point D and the entering position B and the distance $\gamma$ between the position C indicating the entering direction and the start point D (hereinafter also called "escape distance $\gamma$ from the start point D") may be set as default values or may be designated in the form of conversational input through the console 2. The XYZ coordinates of the approach position A and the XYZ coordinates of the entering position B are calculated on the basis of the XY coordinates of the start point D, the Z ordinate of the end point E, the difference $\alpha$ and the distance $\beta$ to entering.

Further, the XYZ coordinates of the position C indicating the entering direction are calculated on the basis of the XY coordinates of the start point D, the Z ordinate of the end point E, the escape distance $\gamma$ from the start point D and the difference $\alpha$. The value of the difference $\alpha$, the value of the entering distance $\beta$ and the value of the escape distance $\gamma$ from the start point D can be designated in the form of conversational input so as to be optimized according to the shape of the measurement object 7, the measurement condition, etc.

Movement locus data are formed on the basis of the thus calculated coordinates of the approach position A, the entering position B and the position C indicating the entering direction and the coordinates of the start point D and the end point E, so that a part program for performing automatic contour measurement through the CNC three-dimensional measurement device 6 can be formed.

Further, a test program of movement from the approach position A to the position indicating the entering direction can be formed on the basis of the movement locus data.

Figure 4A:
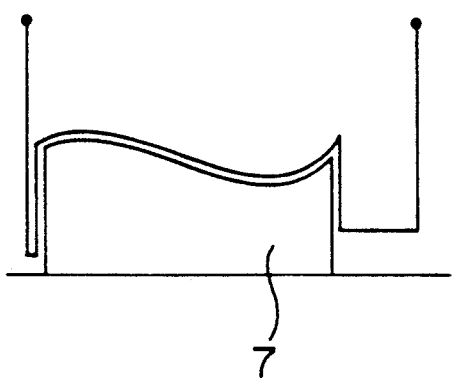
FIGS. 4A and 4B are views showing the movement locus of the probe respectively at the time of measurement and at the time of simulation.
Figure 4B:
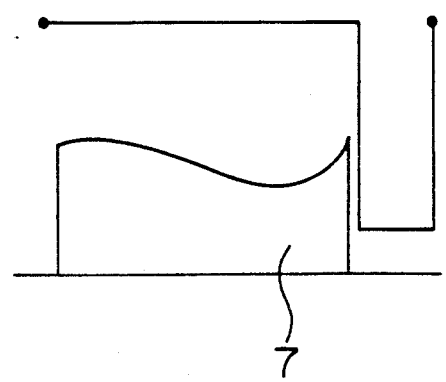

FIGS. 4A and 4B illustrate the movement from the approach position to the end position, of the probe which touches the measurement object 7 at the time of measurement. FIG. 4A shows a movement locus at the time of ordinary measurement. FIG. 4B shows a movement locus at the time of execution of the part program movement test program formed together with the part program by the aforementioned processing.

As shown in FIG. 4B, the movement from the approach position to the position indicating the entering direction can be actually simulated with respect to all measurement lines according to the test program, so that the movement at the time of measurement can be checked up in advance.

Because the test program is formed together with the part program for performing automatic contour measurement so that the movement can be checked up in advance according to the test program, a long-time unmanned measurement in the three-dimensional measurement device 6 can be made. Because there is no necessity that a person must always monitor the three-dimensional measurement device 6, workability can be improved. Further, more accurate measurement can be made by collecting a larger number of measurement data pertaining to a larger number of positions. Further, because data are extracted on the basis of two-dimensional CAD graphic information, measurement positions can be easily designated directly by a designer.

As described above, according to the present invention, not only a part program for performing contour measurement through a three-dimensional measurement device but a test program for simulating the measurement operation in advance are formed by calculating the XYZ coordinates of the approach position, entering position, etc. on the basis of input data pertaining to the measurement position and measurement condition described in two-dimensional CAD information. Because data are extracted on the basis of such two-dimensional CAD graphic information, measurement positions can be easily designated directly by a designer. Further, because the movement can be checked up in advance according to the test program, a long-time unmanned operation of the three-dimensional measurement device can be made. Accordingly, shortening of the measurement time and improvement of workability can be attained. In addition, more accurate measurement can be made by collecting a larger number of measurement data pertaining to a larger number of positions.

What is claimed is:

1. An automatic measuring apparatus for measuring a three-dimensional contour of a measurement object, said automatic measuring apparatus comprising:

means for forming a part program which determines a movement locus of a probe of a computer numerical control (CNC) three-dimensional measurement device along a first path from an approach point through an entering point to a start point and a second path along a contour of a standard object designed by a CAD device from said start point to an end point on the basis of position data indicative of respective positions of said approach point, said entering point, said start point, and said end point and contour data indicative of the contour of said standard object and represented by given three dimensional XYZ coordinates, said start and end points being predetermined so as to be disposed on a periphery of a cross-section of said standard object along a given cross-sectional plane, said entering point being predetermined so as to be disposed on said plane of cross-sectional plane and separated from said start point by a predetermined distance in a predetermined direction, said approach point being predetermined so as to be separated from said entering point by a predetermined distance in a selected direction, and at least a part of said position data indicative of the positions of said start and end points and said contour data being stored preliminarily in a memory of said CAD device and used when said part program is formed;

means for forming a test program to simulate a part of said part program which determines a part of the first path of said movement locus of the probe from said approach point to an intermediate point disposed between the entering point and the start point; and means for measuring a three-dimensional contour of a measurement object using a said part program.

2. An automatic program forming apparatus according to claim 1, wherein said intermediate point is separated from said start point by a selected distance.

3. An automatic program forming apparatus according to claim 2, wherein said measurement object is located on a base plate, said XYZ coordinates are selected such that the Z coordinate extends in a direction vertical to said base plate, and said approach point is separated from said entering point in a direction of the Z coordinate.

4. An automatic program forming apparatus according to claim 1, wherein said measurement object is located on a base plate, said XYZ coordinates are selected such that the Z coordinate extends in a direction vertical to said base plate, and said approach point is separated from said entering point in a direction of the Z coordinate.

* * * * *